United States Patent
Chakraborty et al.

(10) Patent No.: US 10,706,432 B2
(45) Date of Patent: Jul. 7, 2020

(54) METHOD, APPARATUS AND NON-TRANSITORY MEDIUM FOR CUSTOMIZING SPEED OF INTERACTION AND SERVICING ON ONE OR MORE INTERACTIONS CHANNELS BASED ON INTENTION CLASSIFIERS

(71) Applicant: [24]7.ai, Inc., San Jose, CA (US)

(72) Inventors: Abir Chakraborty, Bangalore (IN); Viswanath Gangavaram, Bangalore (IN)

(73) Assignee: [24]7.ai, Inc., San Jose, CA (US)

( * ) Notice: Subject to any disclaimer, the term of this patent is extended or adjusted under 35 U.S.C. 154(b) by 1193 days.

(21) Appl. No.: 14/856,465

(22) Filed: Sep. 16, 2015

(65) Prior Publication Data

US 2016/0078456 A1 Mar. 17, 2016

Related U.S. Application Data

(60) Provisional application No. 62/051,656, filed on Sep. 17, 2014.

(51) Int. Cl.
*G06Q 30/02* (2012.01)
*G06Q 10/06* (2012.01)

(52) U.S. Cl.
CPC ....... *G06Q 30/0202* (2013.01); *G06Q 10/067* (2013.01); *G06Q 30/0201* (2013.01); *G06Q 30/0204* (2013.01); *G06Q 30/0272* (2013.01); *G06Q 30/0281* (2013.01)

(58) Field of Classification Search
None
See application file for complete search history.

(56) References Cited

U.S. PATENT DOCUMENTS

| 8,145,512 | B1 * | 3/2012 | Henne | G06Q 10/063 705/7.11 |
| 8,645,300 | B1 * | 2/2014 | Cowdrey | G06F 16/95 706/46 |
| 8,990,143 | B2 * | 3/2015 | Hohndel | G06N 7/005 706/52 |
| 9,483,308 | B2 * | 11/2016 | Hohndel | G06F 11/3452 |
| 9,727,882 | B1 * | 8/2017 | Huntwork | G06F 9/50 |
| 10,032,180 | B1 * | 7/2018 | Shariff | G06F 16/00 |

(Continued)

Primary Examiner — Octavian Rotaru
(74) Attorney, Agent, or Firm — Perkins Coie LLP; Michael Glenn

(57) ABSTRACT

A computer-implemented method and apparatus for predicting customer intentions defines a plurality of categories for classifying customer interaction data. The plurality of categories includes at least one action category for classifying information related to customer actions on interaction channels. Data signals corresponding to a customer interaction on one or more interaction channels is received. The data signals include information related to at least one customer action. A sequence of values is generated for each customer action for classifying information related to the each customer action. A value is generated corresponding to each action category to configure the sequence of values. The sequence of values is associated with a fixed length equal to a number of action categories in the at least one action category. The fixed length of the sequence of values facilitates use of one or more intention classifiers to predict an intention of the customer.

16 Claims, 7 Drawing Sheets

(56) References Cited

U.S. PATENT DOCUMENTS

| | | | | |
|---|---|---|---|---|
| 10,152,681 | B2* | 12/2018 | Stephan | G06Q 10/06375 |
| 2003/0112275 | A1* | 6/2003 | Proulx | G06F 3/0481 |
| | | | | 715/762 |
| 2003/0158924 | A1* | 8/2003 | DeLegge | H04L 41/5009 |
| | | | | 709/223 |
| 2005/0033712 | A1 | 2/2005 | D'Ambrosio et al. | |
| 2005/0189415 | A1* | 9/2005 | Fano | G06N 20/00 |
| | | | | 235/383 |
| 2007/0127692 | A1* | 6/2007 | Varadarajan | G06Q 10/0639 |
| | | | | 379/265.06 |
| 2008/0077462 | A1 | 3/2008 | Patel et al. | |
| 2008/0162487 | A1* | 7/2008 | Richter | G06Q 10/00 |
| 2008/0215426 | A1* | 9/2008 | Guldimann | G06Q 30/02 |
| | | | | 705/14.61 |
| 2009/0006181 | A1* | 1/2009 | Ghosh | G06Q 30/02 |
| | | | | 705/26.1 |
| 2009/0024405 | A1* | 1/2009 | Brandes | G06Q 10/10 |
| | | | | 705/342 |
| 2009/0225969 | A1* | 9/2009 | Lankes | H04M 1/2472 |
| | | | | 379/201.04 |
| 2009/0248494 | A1* | 10/2009 | Hueter | G06Q 10/00 |
| | | | | 705/7.29 |
| 2010/0058181 | A1* | 3/2010 | Ganesan | G06Q 10/06 |
| | | | | 715/700 |
| 2010/0138282 | A1 | 6/2010 | Kannan et al. | |
| 2010/0275142 | A1* | 10/2010 | Okubo | G06F 9/451 |
| | | | | 715/765 |
| 2012/0054019 | A1* | 3/2012 | Kitts | G06Q 30/0242 |
| | | | | 705/14.41 |
| 2012/0123993 | A1* | 5/2012 | Wang | G06N 5/043 |
| | | | | 706/52 |
| 2012/0185544 | A1* | 7/2012 | Chang | G06Q 50/01 |
| | | | | 709/206 |
| 2012/0246054 | A1* | 9/2012 | Sastri | G06Q 40/06 |
| | | | | 705/37 |
| 2013/0073935 | A1* | 3/2013 | Bertot | G06Q 10/04 |
| | | | | 715/205 |
| 2013/0218825 | A1* | 8/2013 | Zhang | G06Q 10/04 |
| | | | | 706/52 |
| 2013/0238394 | A1* | 9/2013 | el Kaliouby | H04N 21/812 |
| | | | | 705/7.31 |
| 2013/0317993 | A1* | 11/2013 | Wasserman | G06Q 30/016 |
| | | | | 705/304 |
| 2014/0118239 | A1* | 5/2014 | Phillips | G06F 9/452 |
| | | | | 345/156 |
| 2014/0143655 | A1* | 5/2014 | Alon | G06Q 30/0641 |
| | | | | 715/234 |
| 2014/0149177 | A1* | 5/2014 | Frank | G06F 40/30 |
| | | | | 705/7.29 |
| 2014/0222503 | A1* | 8/2014 | Vijayaraghavan | G06Q 30/0201 |
| | | | | 705/7.29 |
| 2014/0244354 | A1* | 8/2014 | Seifert | G06Q 30/0202 |
| | | | | 705/7.31 |
| 2014/0379428 | A1* | 12/2014 | Phansalkar | G06Q 30/0202 |
| | | | | 705/7.32 |
| 2014/0380285 | A1* | 12/2014 | Gabel | G06N 20/00 |
| | | | | 717/139 |
| 2015/0046224 | A1* | 2/2015 | Adjaoute | G06Q 30/0202 |
| | | | | 705/7.31 |
| 2015/0088790 | A1* | 3/2015 | Chidlovskii | G06Q 30/0202 |
| | | | | 706/12 |
| 2015/0254328 | A1* | 9/2015 | Dereszynski | G06Q 30/0277 |
| | | | | 707/739 |
| 2017/0300966 | A1* | 10/2017 | Dereszynski | G06Q 30/0254 |

* cited by examiner

| C1 | C2 | C3 | C4 | C5 | C6 | C7 | C8 | C9 | C10 | DEPTH | CLASS |
|---|---|---|---|---|---|---|---|---|---|---|---|
| 1 | 0 | 0 | 0 | 0 | 0 | 0 | 0 | 0 | 0 | 1 | P. |
| 1 | 0 | 0 | 0 | 0 | 1 | 0 | 0 | 0 | 0 | 2 | P. |
| 2 | 0 | 0 | 0 | 0 | 1 | 0 | 0 | 0 | 0 | 3 | P. |
| 2 | 0 | 0 | 0 | 0 | 1 | 1 | 0 | 0 | 0 | 4 | P. |
| 2 | 0 | 0 | 0 | 0 | 1 | 1 | 1 | 0 | 0 | 5 | P. |
| 2 | 0 | 0 | 0 | 0 | 1 | 1 | 1 | 1 | 0 | 6 | P. |

FIG. 4

| | CURRENT PAGE | LAST PAGE | LAST BUT ONE PAGE | LAST PAGE TIME-ON-PAGE | LAST BUT ONE PAGE TIME-ON-PAGE | DEPTH | CLASS |
|---|---|---|---|---|---|---|---|
| | 516 | 518 | 520 | 522 | 524 | 526 | 528 |
| 504 | B(1) | B(0) | B(0) | 0 | 0 | 1 | P |
| 506 | B(6) | B(1) | B(0) | T1 | 0 | 2 | P |
| 508 | B(1) | B(6) | B(1) | T6 | T1 | 3 | P |
| 510 | B(7) | B(1) | B(6) | T1_2 | T6 | 4 | P |
| 512 | B(8) | B(7) | B(1) | T7 | T1_2 | 5 | P |
| 514 | B(9) | B(8) | B(7) | T8 | T7 | 6 | P |

METHOD, APPARATUS AND NON-TRANSITORY MEDIUM FOR CUSTOMIZING SPEED OF INTERACTION AND SERVICING ON ONE OR MORE INTERACTIONS CHANNELS BASED ON INTENTION CLASSIFIERS

CROSS REFERENCE TO RELATED APPLICATIONS

This application claims priority to U.S. provisional patent application Ser. No. 62/051,656, filed Sep. 17, 2014, which is incorporated herein in its entirety by this reference thereto.

TECHNICAL FIELD

The invention generally relates to improving customer interaction experiences and more particularly, to a method and apparatus for predicting customer intentions to thereby improve customer experiences.

BACKGROUND

Enterprises, nowadays, offer a multitude of interaction channels to existing/potential customers (hereinafter referred to as 'customers') for enabling the customers to locate products/services of interest, to receive information about products/services, to make payments, to lodge complaints, and the like.

Some non-exhaustive examples of the interaction channels include a web channel, a speech channel, a chat channel, a native mobile application channel, a social channel, and the like.

It is desirable to proactively predict the intention of each customer accessing the interaction channels so that suitable recommendations may be offered to the customer to enhance a customer service experience and/or improve chances of a sale.

Moreover, it is desirable to facilitate use of advanced intention classifiers for customer intention prediction purposes so as to improve an accuracy of the predicted intention of the customers.

SUMMARY

In an embodiment of the invention, a computer-implemented method for predicting customer intentions includes defining, by a processor, a plurality of categories for classifying customer interaction data. The plurality of categories includes at least one action category for classifying information related to customer actions on one or more interaction channels. The information related to the customer actions configures at least in part the customer interaction data. The method receives, by the processor, data signals corresponding to a customer interaction on the one or more interaction channels. The data signals include information related to at least one customer action on the one or more interaction channels. The method generates, by the processor, a sequence of values for each customer action from among the at least one customer action for classifying information related to the each customer action, where a value is generated corresponding to each action category from among the at least one action category to configure the sequence of values. The sequence of values is associated with a fixed length equal to a number of action categories in the at least one action category. The method predicts, by the processor, an intention of a customer by using the sequence of values generated for the each customer action, where the fixed length of the sequence of values facilitates use of one or more intention classifiers by the processor to predict the intention of the customer.

In another embodiment of the invention, an apparatus for predicting customer intentions includes at least one processor and a memory. The memory stores machine executable instructions therein, that when executed by the at least one processor, cause the apparatus to define a plurality of categories for classifying customer interaction data. The plurality of categories includes at least one action category for classifying information related to customer actions on one or more interaction channels. The information related to the customer actions configures at least in part the customer interaction data. The apparatus receives data signals corresponding to a customer interaction on the one or more interaction channels. The data signals include information related to at least one customer action on the one or more interaction channels. The apparatus generates a sequence of values for each customer action from among the at least one customer action for classifying information related to the each customer action, where a value is generated corresponding to each action category from among the at least one action category to configure the sequence of values. The sequence of values is associated with a fixed length equal to a number of action categories in the at least one action category. The apparatus predicts an intention of a customer by using the sequence of values generated for the each customer action, where the fixed length of the sequence of values facilitates use of one or more intention classifiers to predict the intention of the customer.

In another embodiment of the invention, a non-transitory computer-readable medium storing a set of instructions that when executed cause a computer to perform a method for predicting customer intentions is disclosed. The method executed by the computer defines a plurality of categories for classifying customer interaction data. The plurality of categories includes at least one action category for classifying information related to customer actions on one or more interaction channels. The information related to the customer actions configures at least in part the customer interaction data. The method receives data signals corresponding to a customer interaction on the one or more interaction channels. The data signals include information related to at least one customer action on the one or more interaction channels. The method generates a sequence of values for each customer action from among the at least one customer action for classifying information related to the each customer action, where a value is generated corresponding to each action category from among the at least one action category to configure the sequence of values. The sequence of values is associated with a fixed length equal to a number of action categories in the at least one action category. The method predicts an intention of a customer by using the sequence of values generated for the each customer action, where the fixed length of the sequence of values facilitates use of one or more intention classifiers to predict the intention of the customer.

BRIEF DESCRIPTION OF THE FIGURES

FIG. 4 shows a first example tabular form representation of a dataset generated by the apparatus of FIG. 2 for facilitating prediction of a customer's intention, in accordance with an embodiment of the invention;

FIG. 5 shows a second example tabular form representation of a dataset generated by the apparatus of FIG. 2 for facilitating prediction of a customer's intention, in accordance with an embodiment of the invention;

DETAILED DESCRIPTION

The detailed description provided below in connection with the appended drawings is intended as a description of the present examples and is not intended to represent the only forms in which the present example may be constructed or utilized. However, the same or equivalent functions and sequences may be accomplished by different examples.

Figure 1:
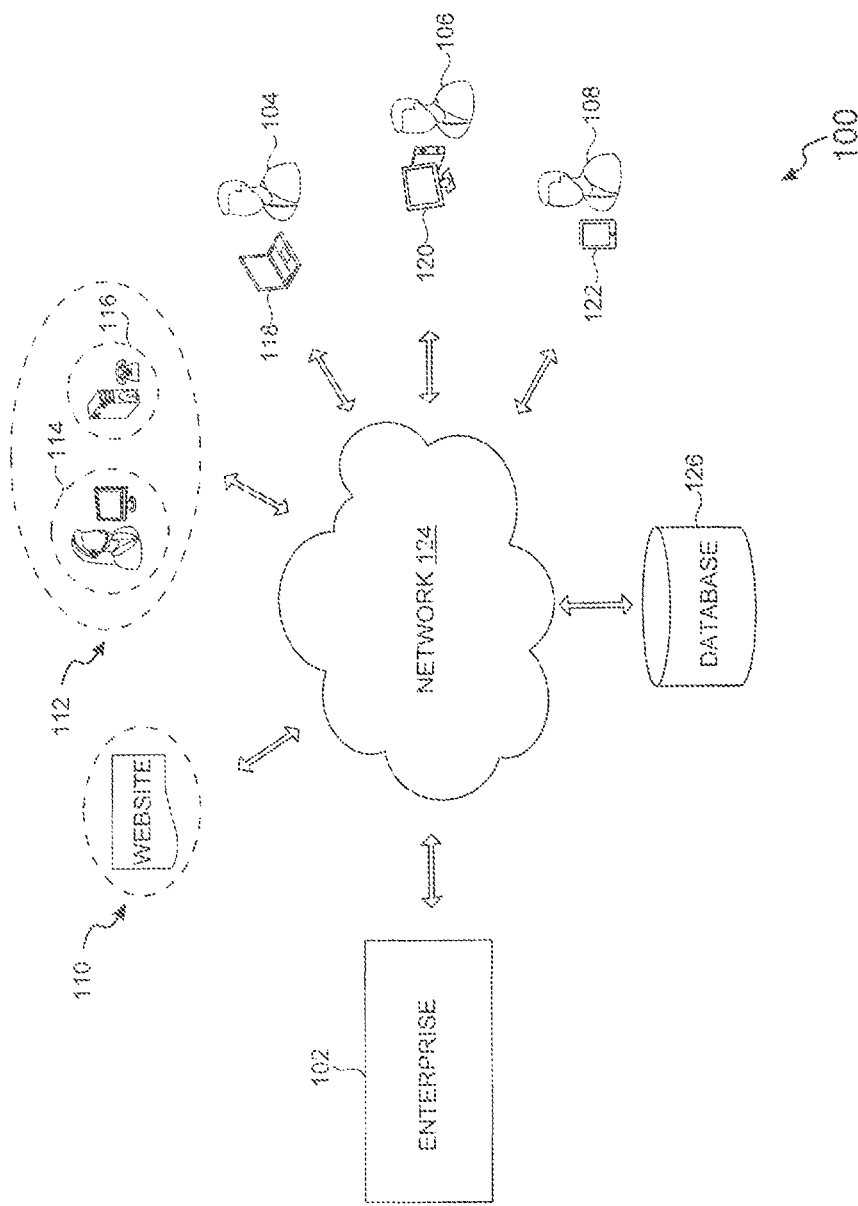
FIG. 1 is a diagram showing an example representation of a customer interaction environment, in accordance with an embodiment of the invention.

FIG. 1 is a diagram showing an example representation of a customer interaction environment 100, in accordance with an embodiment of the invention. The environment 100 depicts a simplified visual representation of an enterprise 102. Further, the environment 100 depicts a plurality of customers of the enterprise 102, such as customers 104, 106 and 108. The customers 104, 106 and 108 are hereinafter collectively referred to as customers and singularly referred to as a customer. It is understood that the environment 100 is depicted to display one enterprise and three customers for illustration purposes and it is understood that the environment 100 may include a plurality of such enterprises and their customers.

In an example scenario, the enterprise 102 may offer a plurality of interaction channels to its customers for enabling the customers to locate products/services of interest, to receive information about products/services, to make payments, to lodge complaints and the like. Some non-exhaustive examples of the interaction channels include a web channel (for example a website), a speech channel (for example, a speech interface for voice call conversations with a live agent or an IVR system), a chat channel (for example, a chat interface for chat conversations with the live agent or a chatbot), a native mobile application channel (for example, a native mobile channel), a social channel (for example, a social media forum or a networking website) and the like. Some of the example interaction channels offered by the enterprise 102 as depicted in environment 100 include a website 110 and a customer sales and support (CSS) center 112. The CSS center 112 is exemplarily depicted to include two customer support representatives in form of a live agent 114 and an IVR system 116. A customer may surf the website 110, or engage in voice call dialogue with the live agent 114 or the IVR system 116, or engage in an interactive chat conversation with the live agent 114 to engage with the enterprise 102. The CSS center 112 is depicted to include two customer support representatives for example purposes and the CSS center 112 may include a number of live agents, chat bots, self assist systems, such as either web or mobile digital self-service and/or interactive voice response (IVR) systems. The term 'customer support representatives' as used herein refers to live agents, chat bots, IVR systems, self assist systems, and, in general to any human or machine interface interacting with customers of enterprises.

The customers 104, 106 and 108 are depicted to be associated with electronic devices, such as electronic devices 118, 120 and 122, respectively. The electronic devices 118, 120 and 122 are configured to facilitate access to the interaction channels offered by the enterprise 102. Examples of the electronic devices 118, 120 and 122 may include mobile phones, personal computers, tablet devices, laptops, smart phones, wearable devices and the like. The interactions conducted using the electronic devices 118, 120, and 122 are depicted as single device/single interaction channel based interactions for illustration purposes only. One or more customers from among the customers 104-108 may be associated with multiple electronic devices and may interact with the customer service representatives over multiple devices and/or using multiple interaction channels (such as a chat channel, a voice channel, an IVR channel and the like). Further, multiple device/channel based interactions between a customer and an agent may be executed concurrently or separately as per the customer's need.

The customers and the customer support representatives may interact with each other for a variety of purposes. In an example scenario, a customer from among the plurality of customers may wish to interact with a customer support representative to inquire about a product or a service prior to making a purchase of the product or the service. In some exemplary scenarios, the customer may also wish to interact with the live agent 114 and/or the IVR system 116 after purchasing a product or a service, for example, to configure or troubleshoot the product, to enquire about upgrades, to enquire about billing or payment or shipping of the product/service, to provide feedback, to register a complaint, to follow up about a previous query and the like. Although the interactions (for example, online chat conversations or voice calls) mentioned herein refer to interactions initiated by the plurality of customers to the live agent 114 and/or the IVR system 116, in some example scenarios the live agent 114 and/or the IVR system 116 may pro-actively initiate interactions with the plurality of customers. For example, the live agent 114 may initiate the interactions for soliciting a purchase of a product/service, for responding to an earlier customer query or for requesting feedback related to a product/service offered on the website 110.

A customer from among the customers 104, 106 and 108 may access an interaction channel from among the website 110, the live agent 114 and the IVR system 116 over the network 124 for engaging with the enterprise 102. Examples of the network 124 may include wired networks, wireless networks or a combination thereof. Examples of wired networks may include Ethernet, local area network (LAN), fiber-optic cable network and the like. Examples of wireless networks may include cellular networks like GSM/3G/4G/CDMA networks, wireless LAN, blue-tooth or Zigbee networks and the like. An example of combination of wired and wireless networks may include the Internet.

In some example scenarios, enterprises such as the enterprise 102 may seek to predict intentions (also referred to herein as 'intents') of the customers accessing the interaction channels. The prediction of intentions may enable the enterprises to make suitable recommendations to the customers to enhance customer service experience and/or improve chances of sale. To predict intents of the customers, the information related to the customer's journey on an interaction channel may be collated and stored in a database, such as the database 126. The term 'journey' as described herein refers to a path a customer may take to reach a goal when using one or more interaction channels. For example, a web journey (i.e. a customer's journey on the website 110) may include a number of web page visits and decision points that carry the customer from one step to another step. In another illustrative example, the term 'journey' may refer to a sequential path followed while accessing the IVR system 116, or an interaction sequence being followed during a chat/voice session with the live agent 114. The information related to the customer's journey on an interaction channel, such as for example web pages visited, IVR options selected, time spent on web pages, call transfers from IVR to live agents and the like may be stored in the database 126 and subsequently analyzed with an aim to predict the intention of the customer and provide suitable recommendations and/or personalize the customer's interaction experiences.

In at least one example embodiment, the database 126 may be configured to store the information related to the customer's journey on an interaction channel in a textual format. For example, in case of voice conversations (for example, voice call conversations or voice/video chat interactions) between a customer and the live agent 114, the data corresponding to the interactions may be converted into textual format using automatic speech recognition (ASR) and statistical language modeling (SLM) techniques and stored in the database 126. In case of text-based chat conversations, the textual content corresponding to the chat conversations may be directly stored in the database 126 as unstructured data, and/or may be stored as structured data derived from unstructured data. In an embodiment, the database 126 may be configured to receive data signals including information related to customer interactions on an on-going basis (i.e. while the interaction is in progress) or subsequent to the completion of the interactions.

Conventional predictive mechanisms typically use intention classifiers to predict intentions of customers accessing the interaction channels. The conventional classifiers are static in nature, or more specifically, the classifiers are capable of processing only fixed length inputs or in other words a fixed number of predictors. Generating fixed length inputs necessitates a fixed number of interaction attributes that are to be determined a priori (for example, at the classifier training stage itself) for prediction purposes. However, determining a fixed number of interaction attributes a priori may be difficult in some scenarios. For example, one of the attributes relevant to predicting intents of customers is 'web pages visited' during customers' journey on the website. Because the web pages visited during a particular website visit (or journey) may be different for different customers, determining a fixed number of web pages visited a priori may be difficult. As a result, conventional classifiers such as for example classifiers based on theorems/algorithms, e.g. Naïve-Bayes, logistic regression (LR), artificial neural network or support vector machines (SVM), cannot be applied directly because these classifiers require fixed length inputs for intention prediction purposes.

Various embodiments of the invention overcome these and other obstacles and provide additional benefits. More specifically, techniques disclosed herein suggest representing the customers' journey data in such a way that any standard (static) classifier may be used to predict the customer's intention. Because the suggested techniques are not tied to any particular classifier, advanced methods, such as SVM and less frequent methods, such as predictive association rules, may be used for customer intention prediction with greater accuracy. An example apparatus configured to predict customers' intentions is explained with reference to FIG. 2.

Figure 2:
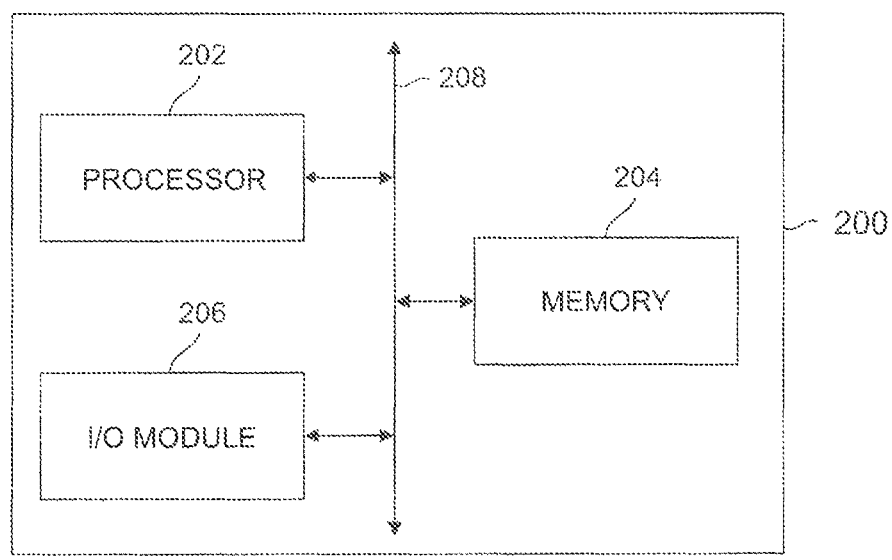
FIG. 2 is a block diagram showing an example apparatus configured to predict customer intentions, in accordance with an embodiment of the invention.

FIG. 2 is a block diagram showing an example apparatus 200 configured to predict customer intentions, in accordance with an embodiment of the invention. In an embodiment, the apparatus 200 may be deployed in a remote server/machine connected to a communication network (such as the network 124 explained with reference to FIG. 1) and capable of executing a set of instructions so as to predict customer intentions. In at least one example embodiment, the apparatus 200 is an electronic system configured to receive data signals corresponding to customer interactions on a plurality of interaction channels and to predict intentions of the customers from the received data signals. The term 'customer' as mentioned herein and throughout the description refers to an existing or a potential user of products and/or services offered by an enterprise. Moreover, the term 'interaction' as mentioned herein may refer to any form of communication between a customer and an enterprise. For example, a customer interacting on a phone or chatting using a chat application with an agent associated with the enterprise is illustrative of an interaction between the customer and the enterprise. In another example scenario, a customer browsing through a website associated with an enterprise is also illustrative of an interaction between the customer and the enterprise. In some example scenarios, the 'interaction' may be initiated by the customer or proactively initiated by an agent of the enterprise as explained with reference to FIG. 1. Further, the interactions may be related to resolving queries of the customer regarding sales or service, for advertising, for containing negative sentiments over social media, for addressing grievances of the customer, for escalation of customer service issues, for enquiring about upgrades, for enquiring about billing or payment or shipping of the product/service, for providing feedback, for requesting feedback, for registering a complaint or to follow up about a previous query and the like.

Enterprises and their customers may interact with each other on various interaction channels, such as for example, a web channel, a chat channel, a speech channel, a social channel, a native mobile application channel, an IVR channel or an in-person/physical channel, such as for example, a customer visit to an enterprise store or a retail outlet. In some embodiments, interactions between the enterprises and the customers may be conducted on two or more interaction channels simultaneously. For example, an agent of an enterprise may assist a customer to register on a website on the customer's tablet device by taking the customer through the various steps involved in the registration process over a phone call. In such a case, the interaction may be simultaneously conducted over the web channel as well as the speech channel. Moreover, in some example embodiments, interactions may be traversed from one interaction channel to another interaction channel.

The apparatus 200 includes at least one processor, such as a processor 202 and a memory 204. It is noted that though the apparatus 200 is depicted to include only one processor, the apparatus 200 may include more number of processors therein. In an embodiment, the memory 204 is capable of storing machine executable instructions. Further, the processor 202 is capable of executing the stored machine executable instructions. In an embodiment, the processor 202 may be embodied as a multi-core processor, a single core processor, or a combination of one or more multi-core processors and one or more single core processors. For example, the processor 202 may be embodied as one or more of various processing devices, such as a coprocessor, a microprocessor, a controller, a digital signal processor (DSP), a processing circuitry with or without an accompanying DSP, or various other processing devices including integrated circuits such as, for example, an application specific integrated circuit (ASIC), a field programmable gate array (FPGA), a microcontroller unit (MCU), a hardware accelerator, a special-purpose computer chip, or the like. In an embodiment, the processor 202 may be configured to execute hard-coded functionality. In an embodiment, the processor 202 is embodied as an executor of software instructions, wherein the instructions may specifically configure the processor 202 to perform the algorithms and/or operations described herein when the instructions are executed. The processor 202 may include, among other things, a clock, an arithmetic logic unit (ALU) and logic gates configured to support various operations of the processor 202.

The memory 204 may be embodied as one or more volatile memory devices, one or more non-volatile memory devices, and/or a combination of one or more volatile memory devices and non-volatile memory devices. For example, the memory 204 may be embodied as magnetic storage devices (such as hard disk drives, floppy disks, magnetic tapes, etc.), optical magnetic storage devices (e.g. magneto-optical disks), CD-ROM (compact disc read only memory), CD-R (compact disc recordable), CD-R/W (compact disc rewritable), DVD (Digital Versatile Disc), BD (Blu-ray® Disc), and semiconductor memories (such as mask ROM, PROM (programmable ROM), EPROM (erasable PROM), flash ROM, RAM (random access memory), etc.).

The apparatus 200 also includes an input/output module 206 (hereinafter referred to as 'I/O module 206') for providing an output and/or receiving an input. The I/O module 206 is configured to be in communication with the processor 202 and the memory 204. Examples of the I/O module 206 include, but are not limited to, an input interface and/or an output interface. Examples of the input interface may include, but are not limited to, a keyboard, a mouse, a joystick, a keypad, a touch screen, soft keys, a microphone, and the like. Examples of the output interface may include, but are not limited to, a display such as a light emitting diode display, a thin-film transistor (TFT) display, a liquid crystal display, an active-matrix organic light-emitting diode (AMOLED) display, a microphone, a speaker, a ringer, a vibrator, and the like. In an example embodiment, the processor 202 may include I/O circuitry configured to control at least some functions of one or more elements of the I/O module 206, such as, for example, a speaker, a microphone, a display, and/or the like. The processor 202 and/or the I/O circuitry may be configured to control one or more functions of the one or more elements of the I/O module 206 through computer program instructions, for example, software and/or firmware, stored on a memory, for example, the memory 204, and/or the like, accessible to the processor 202.

In an embodiment, various components of the apparatus 200, such as the processor 202, the memory 204 and the I/O module 206 are configured to communicate with each other via or through a centralized circuit system 208. The centralized circuit system 208 may be various devices configured to, among other things, provide or enable communication between the components (202-206) of the apparatus 200. In certain embodiments, the centralized circuit system 208 may be a central printed circuit board (PCB) such as a motherboard, main board, system board, or logic board. The centralized circuit system 208 may also, or alternatively, include other printed circuit assemblies (PCAs) or communication channel media.

The apparatus 200 as illustrated and hereinafter described is merely illustrative of an apparatus that could benefit from embodiments of the invention and, therefore, should not be taken to limit the scope of the invention. The apparatus 200 may include fewer or more components than those depicted in FIG. 2. Moreover, the apparatus 200 may be implemented as a centralized apparatus, or, alternatively, the various components of the apparatus 200 may be deployed in a distributed manner while being operatively coupled to each other. In another embodiment, the apparatus 200 may be embodied as a mix of existing open systems, proprietary systems and third party systems. In another embodiment, the apparatus 200 may be implemented completely as a set of software layers on top of existing hardware systems. In an exemplary scenario, the apparatus 200 may be any machine capable of executing a set of instructions (sequential and/or otherwise) so as to predict customer intentions.

In an embodiment, the processor 202 is configured to, with the content of the memory 204, cause the apparatus 200 to define a plurality of categories for classifying customer interaction data. The term 'customer interaction data' as used herein encompasses all kinds of information related to a customer interaction. For example, in case of a customer visit to a website, information related to customers' browser, operating system and device, time of browsing, day of browsing, whether the visit was triggered by a paid search or an organic search, how often and how frequently the customer visits the website, the web pages visited by the customer, time spent on each web page, options or drop down menus selected on the visited web pages, whether the customer was offered chat assistance or not, whether the customer purchased an item or not, etc., may configure the customer interaction data. Similarly, in case of a customer chat with a live agent, information related to customer concern category, whether the customer concern was correctly identified or not, whether the customer was satisfied with the agent response or not, whether the customer concern was resolved or not in addition to information such as the customers' messaging application, operating system, device, time of chatting, day of chatting and the like, may configure the customer interaction data.

Accordingly, the customer interaction data includes information related to both static attributes and dynamic attributes associated with the customer interaction. The term 'static attributes' as used herein refer to those attributes which are associated with values that are likely to remain constant for a particular interaction session, whereas, the term 'dynamic attributes' as used herein refer to those attributes whose values are likely to change for different interaction sessions for the same customer. Examples of static attributes may include attributes configured to capture information like, but not limited to, a type of electronic device being used by the customer for interaction purposes (for example, a mobile phone, a tablet computer, a wearable device, a laptop and the like), a web browser being used for browsing an enterprise website (for example, a popular browser like Firefox Mozilla, Apple Safari, Google Chrome or Microsoft Internet Explorer or a custom browser), an operating system associated with the customer device (for example, Android operating system, iOS, Windows and the like), a day/time of interaction (for example, a time of the day, a day of a week/month and the like), a frequency of customer's interaction (for example, a frequency of visiting a web page or contacting a customer support center and the like). Examples of dynamic attributes may include attributes configured to capture information like, but not limited to, a type of customer concern, time spent in an interaction (for example, time spent on a particular page or time spent on a particular voice call), options selected during the interaction (for example, web pages visited, IVR options selected, chat offer accepted and the like), channel transfers (for example, information related to whether the customer was offered channel transfer, did the customer accept the offer and the like) and concern resolution status (for example, information related to whether the customer concern was resolved or escalated, and the like).

In at least one example embodiment, the apparatus 200 is caused to define some categories to classify information related to static attributes and some categories to classify information related to dynamic attributes. The categories defined to classify information related to static attributes are referred to herein as 'non-action categories' and the categories defined to classify information related to dynamic attributes are referred to herein as 'action categories' (because at least some of those categories are configured to classify information related to customer actions, such as web pages visited, IVR options selected, drop-down menus opted for, etc.). The action categories and the non-action categories together configure the plurality of categories defined to classify the customer interaction data.

The defining of the plurality of categories is further explained with reference to following illustrative example: Consider a website associated with ten web pages. In an example scenario, for a customer visiting the website, the plurality of attributes that are to be captured include browser related information related to the customer's electronic device, time/date information related to the customer's visit to the website and web pages visited during the customer's journey on the website. The apparatus 200 may be caused to define two non-action categories for each of the two static attributes (i.e. browser related information related to the customer's electronic device and time/date information related to the customer's visit to the website). Further, the apparatus 200 may be caused to define ten page categories corresponding to the ten web pages associated with the website. Accordingly, a total of 12 categories (i.e. two categories corresponding to two static attributes and ten categories corresponding to a dynamic attribute) may be defined by the apparatus 200 to classify information related to a customer journey on the web channel. Similarly, for a customer journey on a speech channel (for example, voice call conversation between a customer and an agent), the apparatus 200 may be caused to define categories to classify information related to time/day of calling, a type of customer concern, a concern resolution status (i.e. whether the customer concern was resolved or not), a purchase/non-purchase status (i.e. whether the voice call lead to purchase or non-purchase of product/service) and the like.

In an embodiment, the processor 202 is configured to, with the content of the memory 204, cause the apparatus 200 to receive data signals corresponding to a customer interaction on the one or more interaction channels. More specifically, the apparatus 200 is caused to receive the customer interaction data corresponding to the customer interaction in form of data signals. It is understood that the term 'data signals' includes not only an indication of receipt of data corresponding to a customer interaction but also the actual data content itself. In at least one example embodiment, the I/O module 206 of the apparatus 200 is caused to receive interaction data corresponding to the customer interaction on the one or more interaction channels. In an embodiment, the I/O module 206 is configured to be communicably associated with a database, such as the database 126 of FIG. 1, and/or with a CSS centre, such as the CSS center 112 explained with reference to FIG. 1. The I/O module 206 may receive the data signals corresponding to the interaction data from the database and/or the CSS center.

In at least one embodiment, interaction data may include chat transcripts and/or text transcripts of voice conversations between the customer and the agent. In at least some embodiments, the I/O module 206 may also be communicably associated with customer touch points, such as mobile phones, tablet devices, personal computers and the like, so as to receive data related to customer interactions from native mobile applications or from speech conversations. In at least one example embodiment, the data signals include information related to customer actions on those interaction channels. For example, if the customer journey corresponds to an IVR-based interaction, then the I/O module 206 of the apparatus 200 may be caused to receive data signals including information corresponding to customer issue category, IVR options selected, time spent on resolving specific issue, call transfers if any, and the like. The I/O module 206, the electronic devices of the customers/agents and/or the IVR systems, such as the IVR system 116 of FIG. 1, may include requisite hardware, software and/or firmware (not shown in FIG. 2) for interacting with each other. In an embodiment, the I/O module 206 is configured to store the received data signals in the memory 204.

In an embodiment, the processor 202 is configured to, with the content of the memory 204, cause the apparatus 200 to classify the information received in the form of data signals, based on the plurality of categories. Accordingly, the information related to static attributes, such as for example, device information, browser information, operating system information, interaction timing information and/or interaction frequency information may be classified based on non-action categories. Similarly, the information related to the customer actions on the interaction channels (i.e. information related to dynamic attributes) may be classified based on action categories.

The classification of customer actions is explained with reference to a following illustrative example: In an example scenario, the apparatus 200 is caused to define action categories based on options offered to a customer during an IVR journey. For example, the apparatus 200 is caused to define a category $C_1$ relating to mobile and Internet tariff plans; a category $C_2$ relating to bill payment options; a category $C_3$ relating to connectivity issues; a category $C_4$ relating to call transfer to a live agent; a category $C_5$ relating to concern resolution status and so forth. If a customer's journey involves calling for a mobile bill payment and the call is transferred to an agent and eventually the customer is able to pay his bill successfully, then categorizing such customer actions involve associating the customer actions with categories $C_2$, $C_4$ and $C_5$. In an embodiment, classification of the customer actions further includes associating the each customer action with the index related to the corresponding category from among the plurality of categories. For example, if the categories $C_2$, $C_4$ and $C_5$ are associated with indices 2, 4 and 5, respectively, then the customer actions categorized into these categories may be associated with corresponding indices.

In an embodiment, the processor 202 is configured to, with the content of the memory 204, causes the apparatus 200 to generate a sequence of values for each customer action for classifying information related to the each customer action. In an embodiment, the apparatus 200 is caused to generate a value corresponding to each action category to configure the sequence of values. As a result, the sequence of values, so generated, is associated with a fixed length, which is equal to a number of action categories. For example, if the apparatus 200 is caused to generate binary values, such as a '0' value for indicating no-customer action corresponding to a particular action category and '1' value for indicating a customer action corresponding to that category, then for five action categories defined, a sequence of values generated for classifying customer action corresponding to a second category or $C_2$ may be {0, 1, 0, 0, 0}. Similarly, a sequence of values generated for classifying the customer action corresponding to the fifth category or $C_5$ may be {0, 0, 0, 0, 1} and the like. Accordingly, the apparatus 200 may be caused to generate a binary vector corresponding to each customer action. A length associated with each sequence of values (or binary vector) is equal to the total number of action categories. For example, if ten page categories are defined within twelve categories by the apparatus 200, then the length of the binary vector generated for each page visit (i.e. customer action) is configured to be equal to ten bit representations. Bit representations configuring each sequence of values is mentioned herein for example purposes and various such representations are possible for configuring the binary vector.

In an embodiment, the processor 202 is configured to, with the content of the memory 204, cause the apparatus 200 to configure a dataset comprising a plurality of entries. More specifically, the dataset includes an entry corresponding to the each customer action. In an example embodiment, the entry corresponding to the each customer action is configured by summing the sequence of values corresponding to the each customer action with a sequence of values corresponding to a previous customer action. In other words, a customer interaction or a journey on one or more interaction channels may be represented in terms of multiple accumulated sub-journeys, or more specifically, each customer action may be viewed as an accumulation of current customer action and previous customer actions. In such a scenario, the sequence of values corresponding to the each customer action may be added to a sequence of values corresponding to the previous customer action. For example, binary vectors corresponding to each customer action is generated by summing binary vectors corresponding to one or more prior customer actions. The generation of binary vectors in such a manner is explained with an illustrative example: In an example scenario, customer actions on one or more interaction channels are represented as depicted in equation (1):

$$\{A_1; A_2; A_3; \ldots A_N\} \quad (1)$$

where $A_1$ corresponds to first customer action, $A_2$ corresponds to second customer action and so on and so forth until the last customer action $A_N$.

Further, action categories defined by the apparatus 200 for classifying customer actions on the one or more interaction channels are represented as depicted in equation (2):

$$\{C_1; C_2; C_3; \ldots C_M\} \quad (2)$$

where $C_1$ corresponds to first action category, $C_2$ corresponds to second action category and so on and so forth till the last action category $C_M$.

As explained above, each customer action is classified based on the categories and a sequence of values, for example a binary vector, is generated corresponding to each customer action. For example, the first customer action $A_1$ may be classified into action category $C_1$ and a binary vector $AC_1$ may be generated corresponding to the customer action. Further, a binary vector $AC_2$ may be generated corresponding to the second customer action $A_2$. Because the customer journey until that point may be considered to be composite of accumulated sub journeys associated with customer actions $A_1$ and $A_2$, accordingly a binary vector may be generated to reflect a sum of the binary vectors corresponding to the first customer action $A_1$ and the second customer action $A_2$. More specifically, the sum of binary vectors as depicted by '$AC_1+AC_2$' may be generated to represent the customer journey until second customer action $A_2$. The third customer action $A_3$ may similarly be associated with a binary vector $AC_3$ and the customer journey until the third customer action $A_3$ may be configured by addition of binary vectors $AC_1$, $AC_2$ and $AC_3$ and so on and so forth.

A data set including entries corresponding to summed binary vectors and embodied as a matrix is depicted below:

Binary vectors  Times of Action $$\begin{bmatrix} AC_1 & -N \\ AC_1 + AC_2 & -(N-1) \\ AC_1 + AC_2 + AC_3 & -(N-2) \\ \ldots & \ldots \\ \sum_{j=1}^{N} AC_j & -1 \end{bmatrix}$$

Each of the binary vectors '$AC_1$'; '$AC_1+AC_2$'; '$AC_1+AC_2+AC_3$' and so forth are associated with fixed lengths. For example, each of the binary vectors includes 'M' number of bit representations corresponding M number of action categories. Accordingly 'M' columns of the matrix accommodate 'M' bit representations corresponding to each binary vector. In addition to M columns, the data set includes one or more columns (or categories) corresponding to an attribute 'time of action' captured corresponding to each customer action during the customer journey. The data set also includes 'N' rows corresponding to the 'N' customer actions performed by the customer during the customer journey on the one or more interaction channels. Each additional customer action may be accommodated by adding a row to the dataset, whereas addition of new categories (for example, categories corresponding to static or dynamic attributes) may be accommodated by adding columns to the dataset. Another example illustrating generation of binary vectors for each web page visit corresponding to a customer's journey on a website is explained below.

In an example scenario, options selected by a customer on an IVR channel are represented as depicted in equation (3):

$$\{O_1; O_2; O_3; \ldots O_N\} \quad (3)$$

where $O_1$ corresponds to first option selected, $O_2$ corresponds to second option selected and so on and so forth till the last option selected $O_N$.

Further, action categories defined by the apparatus 200 for classifying customer selections on the IVR channel are represented as depicted in equation (4):

$$\{S_1; S_2; S_3; \ldots S_M\} \quad (4)$$

where $S_1$ corresponds to first action category, $S_2$ corresponds to second action category and so on and so forth till the last action category $S_M$.

As explained above, each customer action is classified based on the action categories and a sequence of values or a binary vector is generated corresponding to each customer action, such as a selection of an option on the IVR channel. For example, the first option selected $O_1$ may be classified into the action category $S_1$ and a binary vector $OS_1$ may be generated corresponding to the customer's first action on the IVR channel. Further, a binary vector $OS_2$ may be generated corresponding to the second option selected $O_2$. As the customer journey until that point may be considered to be composite of accumulated sub journeys associated with customer actions $O_1$ and $O_2$, accordingly a binary vector may be generated to reflect a sum of the binary vectors corresponding to the first option selected $O_1$ and the second option selected $O_2$. More specifically, the sum of binary vectors as depicted by '$OS_1+OS_2$' may be generated to represent the customer journey until the second option is selected on the IVR channel. The third option selected may similarly be associated with a binary vector $OS_3$ and the customer journey until the third option selected may be configured by addition of the binary vectors $OS_1$, $OS_2$ and $OS_3$ and so forth. A dataset may then be generated to represent the customer's journey on the IVR channel based on the binary vectors corresponding to web page visits. The data set may be embodied as matrix as shown below:

$$\begin{bmatrix} \text{Binary vectors} & \text{Times of Action} \\ OS_1 & 1 \\ OS_1 + OS_2 & 2 \\ OS_1 + OS_2 + OS_3 & 3 \\ \ldots & \ldots \\ \sum_{j=1}^{N} OS_j & N \end{bmatrix}$$

The above matrix includes 'M+1' columns and 'N' rows. More specifically, the matrix includes 'M' columns corresponding to the 'M' action categories and one additional row displaying an attribute 'number of options selected' computed subsequent to each option selected, whereas the 'N' rows correspond to the 'N' options selected by the customer during the customer journey on the IVR channel. The dataset generated in such a manner is associated with fixed length representations, or more specifically, the dataset is associated with a fixed number of predictors (M+1) and as such can be provided to any static classifier capable of processing fixed length inputs for customer intention prediction purposes.

The representation of the customer journey in terms of accumulated multiple sub journeys results in generation of dataset with less number of predictors and as such, and the representation mechanism is economical. However, summing of sequence of values corresponding to one or more prior customer actions results in loss of information related to the history of the customer journey (for example, information such as sequence of options selected, and the like). Accordingly, in some embodiments, the apparatus 200 is caused to generate one or more binary vectors that are configured to retain sequence information related to prior customer actions. For the illustrative example explained with reference to equations (3) and (4), the apparatus 200 is caused to represent customer's journey on the IVR channel in terms of current option selected, last option selected, last but one option selected and so on (depending upon the order considered), where each option selected is associated with corresponding binary vector. A dataset may then be generated to represent the customer's journey on the IVR channel based on the binary vectors corresponding to the options selected such that entries corresponding to the each customer action comprise a sequence of values corresponding to the each customer action and sequence of values corresponding to one or more previous customer actions.

The dataset may be embodied as a matrix as shown below:

$$\begin{bmatrix} \text{Current Selection} & \text{Last Selection} & \text{Last but one Selection} & \text{No. of Selections} \\ OS_1 & \{0\} & \{0\} & 1 \\ OS_2 & OS_1 & \{0\} & 2 \\ OS_3 & OS_2 & OS_1 & 3 \\ \ldots & \ldots & \ldots & \ldots \\ OS_N & OS_{N-1} & OS_{N-2} & N \end{bmatrix}$$

The above matrix includes '3M+1' columns and 'N' rows. More specifically, because the order of representation is three (as information related to three parameters: current option selected, last option selected and last but one option selected is retained) and the binary vectors (for example, $OS_1$, $OS_{N-1}$ and the like) in each order are associated with 'M' lengths (for example, on account of 'M' categories), there are '3M' columns. Further, the dataset includes one additional column (category) relating to an attribute 'number of options selected', which is computed subsequent to each open selected. The dataset includes 'N' rows corresponding to the 'N' options selected by the customer during the customer journey on the interaction channel. The dataset generated in such a manner is associated with fixed length representations, or more specifically, the dataset is associated with a fixed number of predictors (3M+1) and as such can be provided to any static intent classifier capable of processing fixed length inputs for customer intent prediction purposes.

In at least one embodiment, the memory 204 of the apparatus 200 is configured to store one or more intention classifiers (also referred to herein as 'classifiers'). In an embodiment, a classifier corresponds to a machine learning model associated with learning algorithm from one among a state vector machine (SVM) based algorithm, a Markov model based algorithm, a logical reasoning (LR) based algorithm, a decision tree based algorithm, an artificial neural network based algorithm, a modified naïve Bayes based algorithm and a naïve Bayes based algorithm.

In an embodiment, the processor 202 is configured to, with the content of the memory 204, cause the apparatus 200 to predict an intention of the customer by using the sequence of values generated for the each customer action. More specifically, the processor 202 is caused to provide the configured dataset as an input to the one or more classifiers for predicting the customer's intention. In an embodiment, the apparatus 200 is caused to predict a sub-intention corresponding to the each customer action. More specifically, the processor 202 using the classifier predicts customer intention corresponding to each customer action (for example, each page visit) based on the sequence of values (or binary vector) corresponding to the customer actions and information classified corresponding to the static attributes.

For example, the predicted intention of the customer for accessing the interaction channel may be from one among, a product/service purchase intention, a casual visit intention or information gathering intention. In an embodiment, a final or an overall customer intention corresponding to the customer's journey on the one or more interaction channels is computed based on performing at least one of an averaging, weighted averaging, maximum entry based sorting of the plurality of customer sub-intentions corresponding to plurality of customer actions or web page visits. Alternatively, in an embodiment, a final customer intention corresponding to the customer's journey on the one or more interaction channels is computed based on a latest predicted customer sub-intention corresponding to a last customer action from among the one or more customer actions. The fixed length of the sequence for the each customer action facilitates use of one or more intention classifiers by the processor 202 to predict the sub-intention/intention of the customer.

In some example scenarios, the predicted intention may provide an insight into a future course of action most likely to be performed by the customer. Based on the predicted intention, the apparatus 200 may be caused to provide recommendations to improve the customer interaction experience and/or improve chances of a sale. Examples of the recommendations may include, but are not limited to, recommending upsell/cross-sell products to the customer, suggesting products to upsell/cross-sell to an agent as a recommendation, offering a suggestion for a discount to the agent as a recommendation, recommending a style of conversation to the agent during an interaction, presenting a different set of productivity or visual widgets to the agent to facilitate personalization of interaction with specific persona types on the agent interaction platform, presenting a different set of productivity or visual widgets to the customers with specific persona types on the customer interaction platform, proactive interaction, customizing the speed of interaction, customizing the speed of servicing information and the like.

In some example scenarios, the apparatus 200 may be caused to recommend routing the customer's interaction to the queue with the least waiting time or to the most suitable agent based on an agent persona type or a skill level associated with the agent. In another example embodiment, the recommendations may include offering discounts or promotional offers to the customer. In another example scenario, the recommendations for offering suitable real-time, online or offline campaigns to a customer segment may also be suggested. In at least one example embodiment, the apparatus 200 is caused to provide personalized interaction experience to the customer based on the one or more recommendations. The prediction of customer intentions is further explained using illustrative examples with reference to FIGS. 3, 4, 5 and 6.

Figure 3:
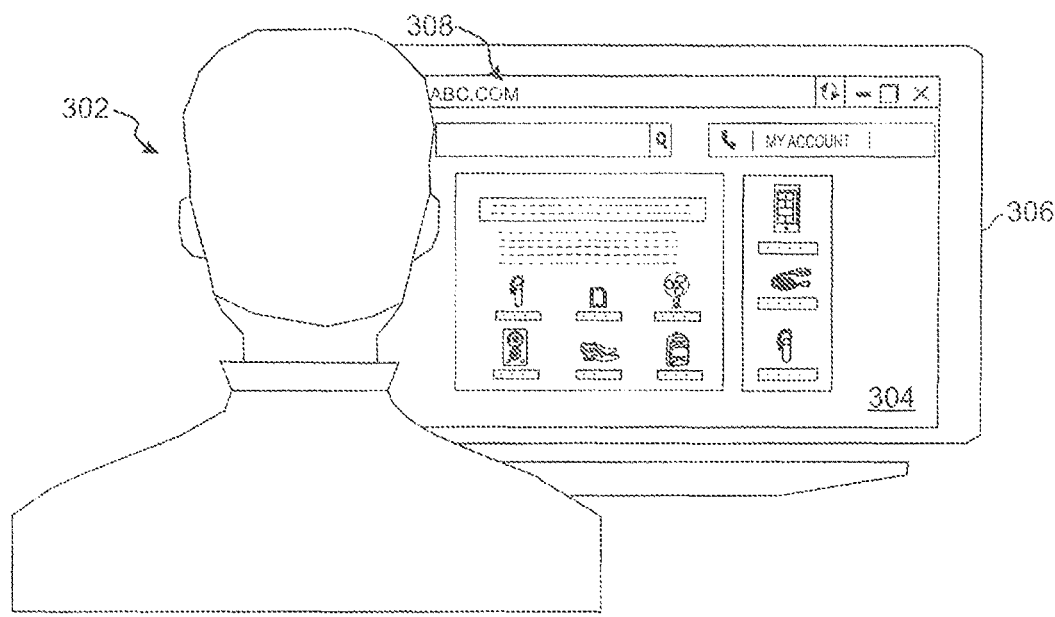
FIG. 3 depicts an example representation of a customer browsing a website using an electronic device, in accordance with an example scenario.

FIG. 3 depicts an example representation of a customer 302 browsing a website 304 using an electronic device 306, in accordance with an example scenario. It is understood that the customer 302 may use a web browser application 308 installed on the electronic device 306 for accessing the website 304 from a remote web server over a network, such as the network 124 explained with reference to FIG. 1. In an example scenario, the apparatus 200 may be caused to define a plurality of categories for classifying actions of the customer 302 on the website 304 to predict an intention of the customer 302 for accessing the website 304. In an example scenario, the apparatus 200 may choose to associate each web page of the website 304 with an action category to facilitate a classification of the actions of the customer 302 during the customer's journey on the website 304. Further, as explained with reference to FIG. 2, each action category may be associated with an index. An example categorization corresponding to the website 304 and the association of the indices to the web pages is depicted in table 1 below:

TABLE 1

| Page Description | Page Category Index |
|---|---|
| Home Page | 1 |
| Existing Customer | 2 |
| . . . | . . . |
| Product Page_9 | 6 |
| Product Page_10 | 7 |
| Cart Page | 8 |
| Checkout Page | 9 |
| Feedback Page | 10 |

In an example scenario, for a website associated with the categories (and corresponding indices) as depicted in Table: 1 above, consider a journey of the customer 302 on the website 304 that involves a visit to a home page, followed by a visit to Products Page_9 to check out the products displayed therein, then a brief return to the home page, followed by a visit to Product Page_10 and thereafter a visit to the Cart page for purchase followed by a visit to the checkout page. In terms of the page category indices, such a journey of the customer 302 may be categorized to generate the following sequence of integers: {1, 6, 1, 7, 8, and 9}. Upon categorization of the customer's actions in terms of web pages visited (as reflected in the sequence of integers), a sequence of values may be generated for each customer action (or more specifically, for each index) to configure the dataset. As explained with reference to FIG. 2, each value may assume a binary form and accordingly generation of the sequence of values may be embodied as a generation of a binary vector for each customer action. In at least one embodiment, the generation of the binary vectors may be performed either in terms of multiple accumulated sub journeys or in terms of retained sequence of current and previous customer actions. A dataset configured from binary vectors generated in terms of multiple accumulated sub journeys is explained with reference to FIG. 4. The dataset configured by binary vectors generated in terms of retained sequence of current and previous customer actions is explained later with reference to FIG. 5.

FIG. 4 shows a first example tabular form representation 400 of a dataset generated by the apparatus 200 of FIG. 2 for facilitating prediction of customer's intention, in accordance with an embodiment of the invention. As explained with reference to FIG. 2, customer's actions during a journey on one or more interaction channels are categorized based on a plurality of categories and a binary vector is generated for each customer action based on its respective categorization. Additional attributes (such as for example, total number of web pages visited so far, information related to the static attributes and the like) in combination with the binary vectors (for example, M+1 or 3M+1 predictors) configure the fixed length inputs in the dataset to be provisioned to a classifier for predicting an intention of the customer. An example dataset corresponding to a journey of the customer 302 on the website 304 is represented in a tabular form in FIG. 4 as the tabular form representation 400 (hereinafter referred to as table 400).

The table 400 depicts a plurality of rows such as rows 402, 404, 406, 408, 410, 412 and 414, and, a plurality of columns, such as columns 416, 418, 420, 422, 424, 426, 428, 430, 432, 434, 436 and 438. The row 402 includes a plurality of cells with each cell serving as a column heading for columns 416-438. For example, column headings for columns 416 to 434 depict categories C1 to C10 corresponding to page category indices 1 to 10 depicted in Table: 1, respectively. The rows 404 to 414 are depicted to include binary vectors generated corresponding to the customer's action of visiting web pages in sequence {1, 6, 1, 7, 8, and 9}. For example, binary vector corresponding to home page visit (associated with page category index '1') is depicted to {1 0 0 0 0 0 0 0 0 0}. The subsequent visit to Product Page_9 (associated with page category index '6') results in a binary vector which is a sum of binary vectors corresponding to home page visit and the visit to Product Page_9 and is depicted to {1 0 0 0 0 1 0 0 0 0}. The return to the home page results in a binary vector which is a sum of binary vectors corresponding to home page visit and previous web page visits and is depicted to {2 0 0 0 0 1 0 0 0 0}. The subsequent visits to the Product Page_10, the Cart Page and the checkout page results in generation of binary vectors in a similar manner. In addition to the binary vectors, the table 400 includes a column 436 with a column heading 'Depth' indicating that the row entries in the column 436 correspond to the total number of pages visited computed subsequent to each web page visit by the customer. For example, upon accessing the home page, the first row entry (below the column heading) in column 436 depicts a value '1' indicating one web page visited so far. Upon subsequent visit to the Product Page_9, the second row entry in column 436 depicts a value '2' indicating two web pages visited so far and so on and so forth. A binary vector corresponding to a web page visit along with the corresponding information related to the number of web pages visited till then, configure the fixed length input (i.e. fixed number of predictors) for the dynamic attribute 'number of web pages visited'. For example, the binary vector {2 0 0 0 0 1 1 0 0 0} along with the depth information of '4' web pages visited so far corresponding to the visit to Product Page_10 configure a fixed length input of 11 (10+1) predictors. The table 400 may include additional columns for capturing information related to other dynamic attributes, such as for example, time spent on each web page, options selected on each web page and the like. Furthermore, the table 400 may include additional columns for capturing information related to static attributes, such as for example device information, browser information, day/time of initiating web browsing session and the like. The fixed number of predictors for the dynamic attributes in addition to the fixed number of predictors for the static attributes together configures the overall fixed length input to be provided to the classifier for prediction of the intention of the customer 302.

The classifier may use one or more algorithms as explained with reference to FIG. 2 and provide the result, such as for example, whether the customer 302 intends to make a purchase or not corresponding to the each customer action. The table 400 includes a column 438 with a column heading 'Class' indicating that each row entry in the column 438 corresponds to the predicted intention of the customer 302 as computed based on the predictors corresponding to the current customer action. More specifically, the customer's intention is predicted for each customer action (for example, for each web page visit) and recorded in the column 438 as Purchase (P) or a Non-Purchase (NP) customer. In table 400, the predicted intention computed corresponding to each customer action is depicted to be 'P', indicating that the predicted customer's intention is to make a purchase. The final or the overall intention of the customer 302 may be determined by taking only the predicted intention corresponding to the last customer action (or last web page visit) or by averaging (or weighted averaging) of predicted intentions for all customer actions so far or by simply sorting maximum entries of particular type (purchase or not purchase) from among the predicted intentions.

FIG. 5 shows a second example tabular form representation 500 of a dataset generated by the apparatus 200 of FIG. 2 for facilitating prediction of customer's intention in accordance with an embodiment. As explained with reference to FIG. 2, the generation of the sequence of values or binary vectors may be performed either in terms of multiple accumulated sub journeys or in terms of retained sequence of current and previous customer actions. For a journey associated with web page visits as characterized by sequence of integers {1, 6, 1, 7, 8, and 9} as explained with reference to FIG. 3, a dataset may be configured by binary vectors generated in terms of current page visit and previous page visits in order to retain information related to history of the customer journey (for example, information such as sequence of web pages visited, and the like). The dataset depicted in the tabular form representation 500 (hereinafter referred to as table 500) corresponds to a dataset configured from binary vectors generated in terms of current and previous web page visits.

The table 500 depicts a plurality of rows such as rows 502, 504, 506, 508, 510, 512 and 514, and, a plurality of columns, such as columns 516, 518, 520, 522, 524, 526 and 528. The row 502 includes a plurality of cells with each cell serving as a column heading for the columns 516-528. For example, the columns 516 to 524 are associated with column headings 'Current Page', 'Last Page', 'Last but one page', 'Last page time-on-page' and 'Last but one page time-on-page'.

The rows 504 to 514 depict binary vectors generated corresponding to the customer's action of visiting web pages in sequence {1, 6, 1, 7, 8, and 9}. For example, for the home page visit, the current page corresponds to the home page itself whereas the last page (visited) and last but one page (visited) are not applicable since the customer 302 initiates the web journey by visiting the home page first. Accordingly, the generated binary vector corresponding to the home page visit (associated with page category index '1') is depicted to be {B(1), B(0), B(0)} where B(1) corresponds to {1 0 0 0 0 0 0 0 0 0} as explained with reference to FIG. 3 and B(0) corresponds to {0 0 0 0 0 0 0 0 0 0} which is a vector of length 10. For the subsequent visit to Product Page_9 (associated with page category index '6)', the current page is the Product Page_9, last page (visited) is the home page and last but one page is not applicable since the Product Page_9 is the second web page visited in the course of the customer journey. The generated binary vector corresponding to the visit to the Product Page_9 is depicted to be {B(6), B(1), B(0)}, where B(6) corresponds to {0 0 0 0 0 1 0 0 0 0} and B(1) corresponds to {1 0 0 0 0 0 0 0 0 0}. Similarly, for subsequent visit to the home page, the current page is home page, the last page (visited) is the Product Page_9 and the last but one page (visited) is the home page again. Accordingly, the generated binary vector corresponding to the home page visit is depicted to be {B(1), B(6), B(1)}, where B(6) corresponds to {0 0 0 0 0 1 0 0 0 0} and B(1) corresponds to {1 0 0 0 0 0 0 0 0 0}. The subsequent visits to the Product Page_10, the Cart Page and the checkout page result in generation of binary vectors in a similar manner as depicted in rows 508, 510 and 512, respectively.

The table 500 also depicts two columns, column 522 and 524, associated with column headings 'Last page time-on-page' and 'Last but one page time-on-page' with row entries configured to capture information related to time spent on last web page visited and time spent on web page previous to the last web page visited. For example, the row entries below the column headings for the columns 522 and 524 depict zero values, as there are no previously visited web pages corresponding to the home page visit. Upon subsequent visit to the Product Page_9, the second row entry in the column 522 depicts a value 'T1' representing time spent on the home page. For the subsequent visit to the home page, the third row entries in each of the columns 522 and 524 depict values 'T6' and 'T1' representing times spent on Product Page_9 and the home page respectively. The row entry 'T1_2' in the columns 522 and 524 represent the time spent on home page when it is visited the second time. Thus, it can be seen that inclusion of additional page attribute, such as the time spent on a web page' amounts to including additional columns equal to the number of attributes (as opposed to creating multitude of categories in conventional implementations). The table 500 further includes a column 526 with a column heading 'Depth' indicating that the row entries in the column 526 correspond to the total number of pages visited computed subsequent to each web page visit by the customer 302. The column 526 is computed in a manner similar to the column 436 in table 400 and is not explained herein. A binary vector corresponding to the web page visit along with the corresponding information related to the time spent on the visited web pages and the number of web pages visited till then, configure the fixed length input (i.e. fixed number of predictors) to be provisioned to the classifier for predicting a customer's intent. The classifier may utilize one or more algorithms as explained with reference to FIG. 2 and provide the result, such as for example, whether the customer 302 intends to make a purchase or not during the on-going web journey.

The table 500 includes a column 528 with a column heading 'Class' indicating that each row entry in the column 428 corresponds to the predicted intention of the customer 302 as computed based on the predictors corresponding to the current customer action. As explained with reference to the table 400 in FIG. 4, the intention of the customer 302 is predicted for each customer action (for example, for each web page visit) and recorded in the column 528 as Purchase (P) or a Non-Purchase (NP) customer. In the table 500, the predicted intention computed corresponding to each customer action is depicted to be 'I', indicating that the predicted intention of the customer 302 is to make a purchase. The final or the overall intention of the customer 302 may be determined by taking only the predicted intention corresponding to the last customer action (or last web page visit) or by averaging (or weighted averaging) of predicted intentions for all customer actions so far or by sorting maximum entries of particular type (purchase or not purchase) from among the predicted intentions. Datasets similar to those represented by the tables 400 and 500 may be configured for customer journeys that did not result in a purchase. Moreover, although the tables 400 and 500 are depicted to include columns corresponding to dynamic attributes, such as 'web pages visited', 'number of web pages visited', 'time spent on web page', it is straightforward to consider static attributes in these datasets, which amount to augmenting additional columns (one for each static attributes). Furthermore, other web page related attributes may be added as additional columns.

Customer interactions may not be limited to a single interaction channel. Indeed, in many scenarios, the customer interaction may be conducted over multiple interaction channels either sequentially or concurrently. In such a scenario, the apparatus 200 may be caused to define a plurality of categories to encompass static and dynamic attributes for the multiple interaction channels being used by the customer for interaction purposes. An example defining of categories for classifying customer actions across interaction channels is explained with reference to FIG. 6.

Figure 6:
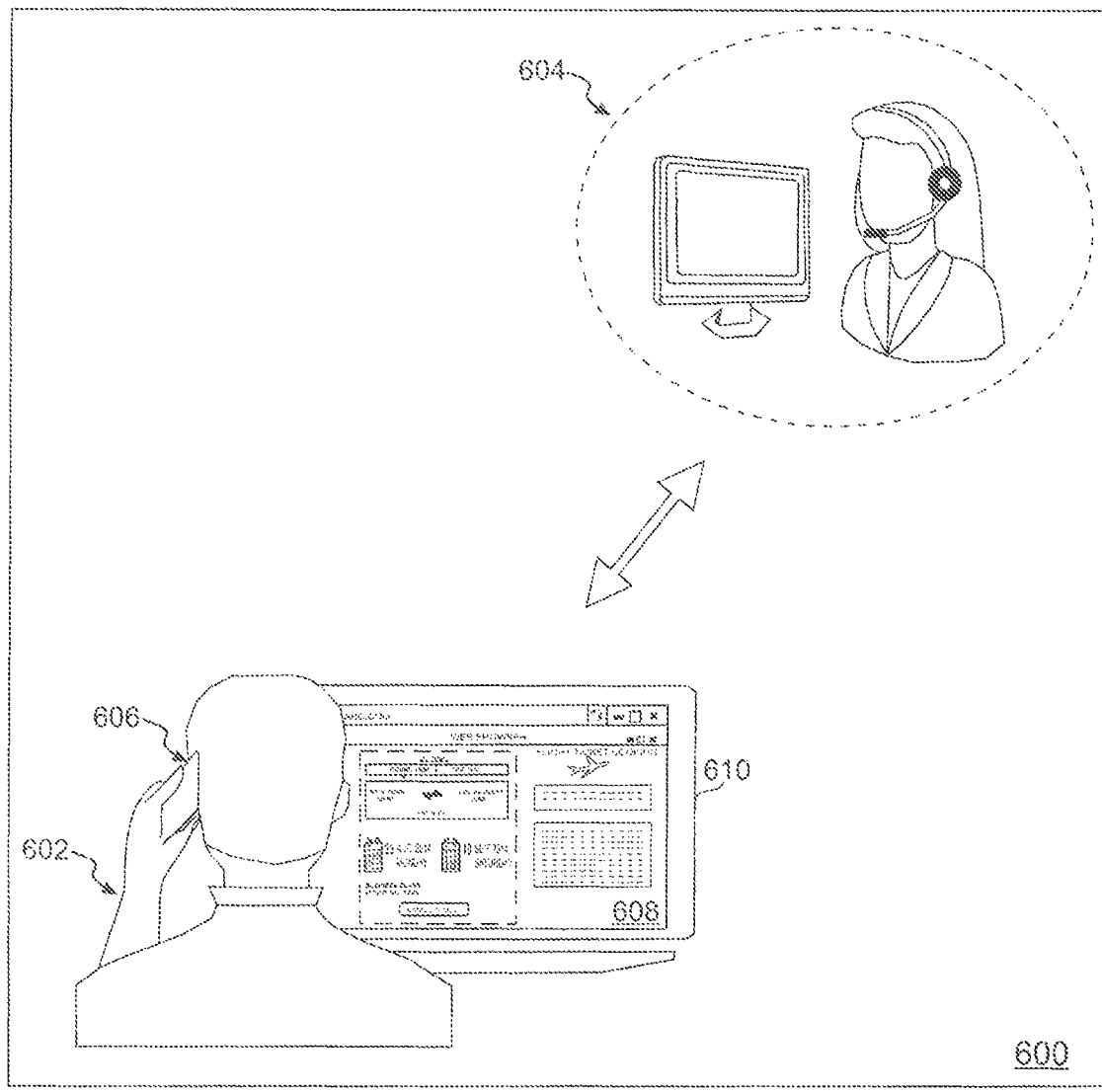
FIG. 6 shows a diagram depicting an example customer interaction scenario for illustrating a defining of categories for classifying customer actions across interaction channels, in accordance with an embodiment of the invention.

FIG. 6 is a diagram 600 depicting an example customer interaction scenario is shown for illustrating a defining of categories for classifying customer actions across interaction channels, in accordance with an embodiment of the invention. Accordingly, the diagram 600 depicts a customer 602 involved in a voice call conversation with a customer support representative 604 (hereinafter referred to as agent 604). In an example scenario, the customer 602 may have had difficulty in booking a flight ticket being accessed on a native mobile application on the customer's mobile phone 606 and accordingly the customer 602 may have contacted the agent 604 to seek assistance. In an example scenario, the agent 604 may direct the customer 602 to some web pages/links/drop-down options on an airline website 608 (hereinafter referred to as website 608) in order to assist the customer 602 to book the flight ticket. In such a scenario, the customer interaction has been initialized on the native mobile application channel and continued concurrently on the speech channel and the web channel. The apparatus 200 explained with reference to FIG. 2, may be caused to define categories to capture static attributes associated with the customer interaction on the native mobile application, web and speech interaction channels. For example, the apparatus 200 may be caused to define non-action categories to capture information related to static attributes, such as types of customer device being used, such as for example the mobile phone 606 and a desktop computer 610, the frequency of using the native mobile application, the web browser being used for accessing the website 608, the day/time of accessing the native mobile application, the day/time of contacting the agent 604 and the like. Additionally, the apparatus 200 may be caused to define action categories and assign an index to each action category. For example, a category may be defined to capture customer action related to each user interface (UI) screen of the native mobile application as exemplarily depicted in table 2:

TABLE 2

| Application Category | Index |
|---|---|
| Application Home UI | 1 |
| View Past Trips UI | 2 |
| Trip Scheduling UI | 3 |
| Ticket Booking UI | 4 |
| Payment UI | 5 |
| ... | ... |
| Help Option | 8 |
| Ticket Cancellation UI | 9 |
| Log-out Screen | 10 |

Further, one or more categories may be defined by the apparatus 200 to capture the customer actions associated with customer interaction with the agent 604, such as for example, type of customer concern, call transfers if any, time spent during interaction, customer concern resolution status and the like. Furthermore, the apparatus 200 may be caused to define page-wise categories as explained with reference to FIGS. 3 and 4 for classifying customer actions on the website 608. Accordingly, the apparatus 200 may be caused to define a plurality of categories to classify information related to customer interaction on the native mobile application, web and speech interaction channels. Thereafter, the apparatus 200 may be caused to generate a sequence of values (or binary vectors) upon completion of each customer action on an interaction channel. The apparatus 200 may then be caused to configure a dataset as explained with reference to FIGS. 4 and 5 and provide the configured dataset to one or more intention classifiers for predicting the intention of the customer 602 and providing recommendation to the customer 602. A method for predicting customer intention is explained with reference to FIG. 7.

Figure 7:
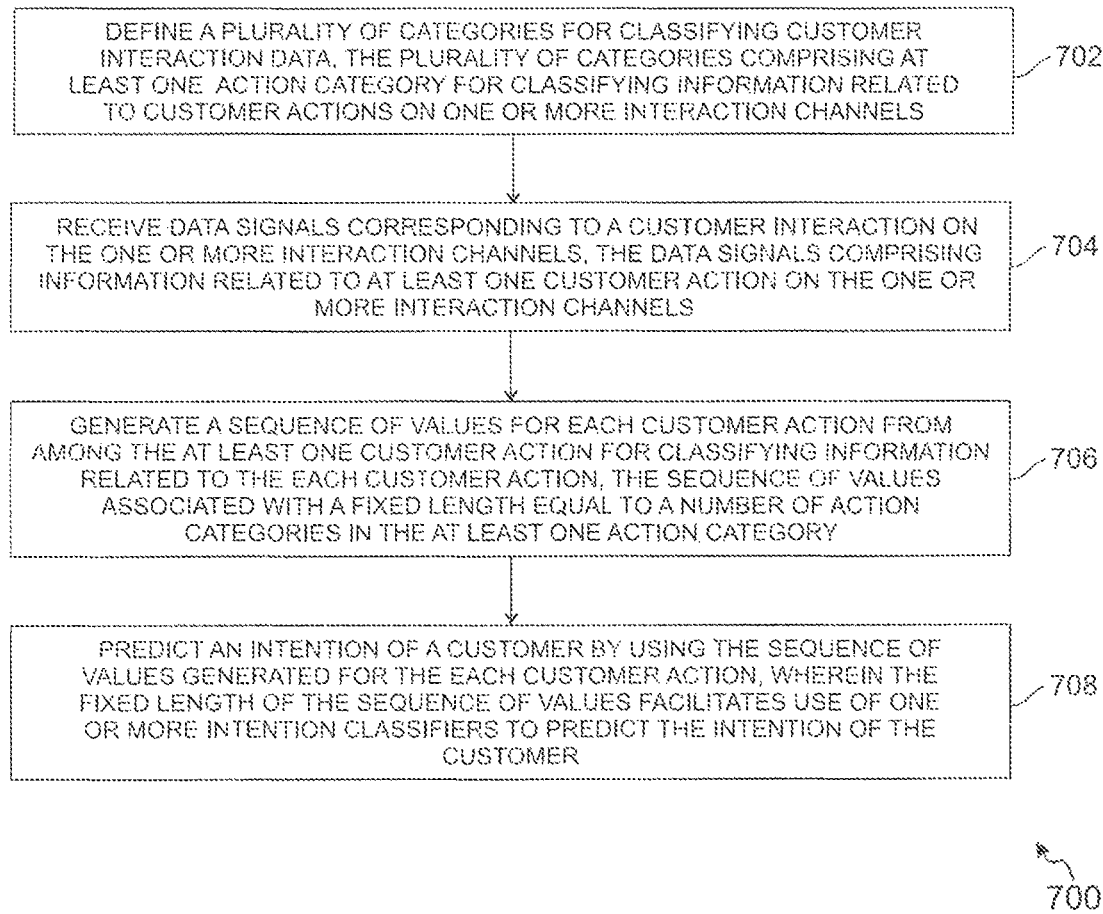
FIG. 7 is a flow diagram of an example method for predicting a customer intention, in accordance with an embodiment of the invention.

FIG. 7 is a flow diagram of an example method 700 for predicting customer intention, in accordance with an embodiment of the invention. The method 700 depicted in the flow diagram may be executed by, for example, the apparatus 200 explained with reference to FIGS. 2 to 6. Operations of the flowchart, and combinations of operation in the flowchart, may be implemented by, for example, hardware, firmware, a processor, circuitry and/or a different device associated with the execution of software that includes one or more computer program instructions. The operations of the method 700 are described herein with help of the apparatus 200. For example, one or more operations corresponding to the method 700 may be executed by a processor, such as the processor 202 of the apparatus 200. Although the one or more operations are explained herein to be executed by the processor alone, the processor is associated with a memory, such as the memory 204 of the apparatus 200, which is configured to store machine executable instructions for facilitating the execution of the one or more operations. The operations of the method 700 can be described and/or practiced by using an apparatus other than the apparatus 200. The method 700 starts at operation 702.

At operation 702 of the method 700, a plurality of categories is defined for classifying customer interaction data. The plurality of categories defined for classifying customer interaction data includes at least one action category for classifying information related to customer actions on one or more interaction channels. In an embodiment, some categories (also referred to herein as non-action categories) may be defined to classify information related to static attributes and some categories (also referred to herein as action categories) may be defined to classify information related to dynamic attributes. The action categories and the non-action categories together configure the plurality of categories defined to classify the customer interaction data. The defining of the plurality of categories may be performed as explained with reference to FIGS. 2 to 6.

At operation 704 of the method 700, data signals corresponding to a customer interaction on the one or more interaction channels are received. In at least one example embodiment, the data signals include information related to at least one customer action on the one or more interaction channels. For example, if the customer journey corresponds to an IVR-based interaction, then the received data signals may include information corresponding to customer issue category, IVR options selected, time spent on resolving specific issue, call transfers if any, and the like.

At operation 706 of the method 700, a sequence of values may be generated for each customer action for classifying information related to the each customer action. In an embodiment, a value is generated corresponding to each action category to configure the sequence of values. In an embodiment, the sequence of values is associated with a fixed length equal to a number of action categories in the at least one action category. In an embodiment, a dataset including entries corresponding to the customer actions may be configured. In an example embodiment, the entry corresponding to each customer action is configured by summing the sequence of values corresponding to the each customer action with a sequence of values corresponding to a previous customer action. In other words, a customer interaction or a journey on one or more interaction channels may be represented in terms of multiple accumulated sub-journeys, or more specifically, each customer action may be viewed as an accumulation of current customer action and previous customer actions. In such a scenario, the sequence of values corresponding to the each customer action may be added to a sequence of values corresponding to a previous customer action. In some embodiments, a dataset may be generated to represent the customer's journey such that entries corresponding to the each customer action comprise a sequence of values corresponding to the each customer action and sequence of values corresponding to one or more previous customer actions. The generation of sequence of values or binary vectors and the subsequent configuration of the dataset may be performed as explained with reference to FIGS. 2, 3, 4 and 5 and is not explained again herein for sake of brevity.

At operation 708 of the method 700, an intention of a customer may be predicted by using the sequence of values generated for the each customer action. More specifically, the configured dataset is provided as an input to one or more intention classifiers (also referred to as 'classifiers') for predicting the customer's intention. In an embodiment, the classifier corresponds to a machine learning model associated with learning algorithm from one among a SVM based algorithm, a Markov model based algorithm, a LR based algorithm, a decision tree based algorithm, an artificial neural network based algorithm, a modified naïve Bayes based algorithm and a naïve Bayes based algorithm. In an embodiment, a sub-intention may be predicted corresponding to the each customer action. More specifically, the classifier may predict customer intention corresponding to each customer action (for example, each page visit) based on the sequence of values (or binary vector) corresponding to the customer actions and information classified corresponding to the static attributes. For example, the predicted intention of the customer for accessing the interaction channel may be from one among, a product/service purchase intention, a casual visit intention or information gathering intention. In an embodiment, a final or an overall customer intention corresponding to the customer's journey on the one or more interaction channels is computed based on performing at least one of an averaging, weighted averaging, maximum entry based sorting of the plurality of customer sub intentions corresponding to plurality of customer actions. Alternatively, in an embodiment, a final customer intention corresponding to the customer's journey on the one or more interaction channels is computed based on a latest predicted customer intention corresponding to a last customer action from among the one or more customer actions. The fixed length of the sequence for the each customer action facilitates use of one or more intention classifiers to predict the sub-intention/intention of the customer. In some example scenarios, the predicted intention may be used to provide recommendations to improve the customer interaction experience and/or improve chances of a sale as explained with reference to FIG. 2.

Without in any way limiting the scope, interpretation, or application of the claims appearing below, advantages of one or more of the exemplary embodiments disclosed herein include an improved prediction of customer's intentions. Various embodiments disclosed herein suggest representing the customer's journey data in such a way that any standard (static) classifier(s) may be used to evaluate customer's intention. As explained above, the predictors associated with the customer's journey data include dynamic attributes and static attributes. Variable length data associated with the dynamic attributes are converted into multiple fixed length data, which may be given to any standard classifier(s) for classification. Accordingly, the dynamic attributes that are part of the customer's journey data can be included easily and further, the representation enables one to explore the effect of multiple attributes simultaneously. Further, conventional implementations, such as those utilizing Modified Naïve Bayes (MNB) based algorithms, become quite complicated upon extending an order of predictors beyond two. However, for techniques suggested herein, extending of the order of predictors is fairly straightforward and involves adding more columns (predictors) of categories. Furthermore, in conventional techniques, such as those utilizing MNB algorithm, a probability of each class is updated. However, the techniques disclosed herein suggest computation of class at each page individually. As a result, the chance of error accumulation is minimal.

Moreover, as the suggested techniques are not tied to any particular classifier, advanced methods such as SVM and less frequent methods such as predictive association rules may be used for customer intention prediction with greater accuracy. Further, techniques disclosed herein also enable predicting the customer's intention in presence of an intervention (say in terms of chat) or predicting a suitable time to intervene during an on-going customer interaction.

Although the invention has been described with reference to specific exemplary embodiments, it is noted that various modifications and changes may be made to these embodiments without departing from the broad spirit and scope of the invention. For example, the various operations, blocks, etc., described herein may be enabled and operated using hardware circuitry (for example, complementary metal oxide semiconductor (CMOS) based logic circuitry), firmware, software and/or any combination of hardware, firmware, and/or software (for example, embodied in a machine-readable medium). For example, the apparatuses and methods may be embodied using transistors, logic gates, and electrical circuits (for example, application specific integrated circuit (ASIC) circuitry and/or in Digital Signal Processor (DSP) circuitry).

Particularly, the apparatus 200, the processor 202, the memory 204 and the I/O module 206 may be enabled using software and/or using transistors, logic gates, and electrical circuits (for example, integrated circuit circuitry such as ASIC circuitry). Various embodiments of the present technology may include one or more computer programs stored or otherwise embodied on a computer-readable medium, wherein the computer programs are configured to cause a processor or computer to perform one or more operations (for example, operations explained herein with reference to FIG. 7). A computer-readable medium storing, embodying, or encoded with a computer program, or similar language, may be embodied as a tangible data storage device storing one or more software programs that are configured to cause a processor or computer to perform one or more operations. Such operations may be, for example, any of the steps or operations described herein. In some embodiments, the computer programs may be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g. magneto-optical disks), CD-ROM (compact disc read only memory), CD-R (compact disc recordable), CD-R/W (compact disc rewritable), DVD (Digital Versatile Disc), BD (Blu-ray (registered trademark) Disc), and semiconductor memories (such as mask ROM, PROM (programmable ROM), EPROM (erasable PROM), flash ROM, RAM (random access memory), etc.). Additionally, a tangible data storage device may be embodied as one or more volatile memory devices, one or more non-volatile memory devices, and/or a combination of one or more volatile memory devices and non-volatile memory devices. In some embodiments, the computer programs may be provided to a computer using any type of transitory computer readable media. Examples of transitory computer readable media include electric signals, optical signals, and electromagnetic waves. Transitory computer readable media can provide the program to a computer via a wired communication line (e.g. electric wires, and optical fibers) or a wireless communication line.

Various embodiments of the invention, as discussed above, may be practiced with steps and/or operations in a different order, and/or with hardware elements in configurations, which are different than those which, are disclosed. Therefore, although the invention has been described based upon these exemplary embodiments, certain modifications, variations, and alternative constructions may be apparent and well within the spirit and scope of the invention.

Although various exemplary embodiments of the invention are described herein in a language specific to structural features and/or methodological acts, the subject matter defined in the appended claims is not necessarily limited to the specific features or acts described above. Rather, the specific features and acts described above are disclosed as exemplary forms of implementing the invention as set forth in the claims.

The invention claimed is:

1. A computer-implemented method, comprising:
defining, by a processor, a plurality of categories for classifying customer interaction data comprising information related to static customer attributes and information related to dynamic customer attributes, the plurality of categories comprising:
at least one action category for classifying information related to customer actions on one or more interaction channels, the information related to the customer actions configuring at least in part the customer interaction data, wherein the at least one action category is defined based on the dynamic customer attributes associated with the customer interaction on the one or more interaction channels, and wherein the dynamic customer attributes associated with the customer interaction correspond to attributes of the customer interaction whose values are likely to change during the customer interaction; and
at least one non-action category configured to facilitate classifying of the information related to the static customer attributes associated with the customer interaction on the one or more interaction channels, wherein the information related to the static customer attributes comprises: interaction timing information or interaction frequency information, and at least one of device information, browser information, operating system information;

receiving, by the processor, data signals corresponding to a customer interaction on the one or more interaction channels, the data signals comprising information related to at least one customer action on the one or more interaction channels, said information comprising binary values where a '0' value indicates a no-customer action corresponding to a particular action category and where a '1' value indicates a customer action corresponding to the particular action category;

configuring the at least one action category and the at least one non-action category to classify together as intention classifiers for the customer interaction data;

generating, by the processor, a sequence of values for each customer action from among the at least one customer action for classifying information related to the each customer action comprising a binary vector corresponding to each customer action associated with a fixed length, wherein a value is generated corresponding to each action category from among the at least one action category to configure the sequence of values, the sequence of values associated with the fixed length equal to a number corresponding to the at least one action category;

predicting, by the processor, with one or more conventional, static intention classifiers that process only fixed length inputs comprising a fixed number of predictors, an intention of a customer by using the sequence of values generated for the each customer action from among the at least one customer action, wherein the fixed length of the sequence of values facilitates use of the intention classifiers by the processor with said one or more conventional, static intention classifiers to predict the intention of the customer; and based on the predicted customer intent, automatically customizing on the one or more interaction channels a speed of interaction with the customer and customizing a speed of servicing information.

2. The method of claim 1, further comprising: configuring, by the processor, a dataset comprising a plurality of entries, the dataset configured to be provided as an input to the one or more intention classifiers for predicting the intention of the customer, wherein the plurality of entries comprise an entry corresponding to each customer action from among the at least one customer action.

3. The method of claim 2, wherein the entry corresponding to the each customer action is configured by summing the sequence of values corresponding to the each customer action with a sequence of values corresponding to a previous customer action.

4. The method of claim 2, wherein the entry corresponding to the each customer action comprises the sequence of values corresponding to the each customer action and a sequence of values corresponding to one or more previous customer actions.

5. The method of claim 1, further comprising:
predicting, by the processor, a sub-intention corresponding to the each customer action, wherein the fixed length of the sequence of values for the each customer action facilitates use of the one or more intention classifiers by the processor to predict the sub-intention corresponding to the each customer action.

6. The method of claim 5, further comprising:
performing, by the processor, at least one of averaging, weighted-averaging and majority entry based sorting of the predicted sub-intention corresponding to the each customer action to predict the intention of the customer.

7. An apparatus, comprising:
at least one processor; and
a memory having stored therein machine executable instructions, that when executed by the at least one processor, cause the apparatus to:
define a plurality of categories for classifying customer interaction data comprising information related to static customer attributes and information related to dynamic customer attributes, the plurality of categories comprising:
at least one action category for classifying information related to customer actions on one or more interaction channels, the information related to the customer actions configuring at least in part the customer interaction data, wherein the at least one action category is defined based on the dynamic customer attributes associated with the customer interaction on the one or more interaction channels, and wherein the dynamic customer attributes associated with the customer interaction correspond to attributes of the customer interaction whose values are likely to change during the customer interaction; and
at least one non-action category configured to facilitate classifying of the information related to the static customer attributes associated with the customer interaction on the one or more interaction channels, wherein the information related to the static customer attributes comprises: interaction timing information or interaction frequency information, and at least one of device information, browser information, and operating system information;

receive data signals corresponding to a customer interaction on the one or more interaction channels, the data signals comprising information related to at least one customer action on the one or more interaction channels, said information comprising binary values where a '0' value indicates a no-customer action corresponding to a particular action category and where a '1' value indicates a customer action corresponding to the particular action category;

configure the at least one action category and the at least one non-action category to classify together as intention classifiers for the customer interaction data;

generate a sequence of values for each customer action from among the at least one customer action for classifying information related to the each customer action comprising a binary vector corresponding to each customer action associated with a fixed length, wherein a value is generated corresponding to each action category from among the at least one action category to configure the sequence of values, the sequence of values associated with the fixed length equal to a number corresponding to the at least one action category;

predict with one or more conventional, static intention classifiers that process only fixed length inputs comprising a fixed number of predictors, an intention of a customer by using the sequence of values generated for the each customer action from among the at least one customer action, wherein the fixed length of the sequence of values facilitates use of the intention classifiers with said one or more conventional, static intention classifiers to predict the intention of the customer; and based on the predicted customer intent, automatically customizing a speed of interaction with the customer and/or customizing on the one or more interaction channels a speed of interaction with the customer and customizing a speed of servicing information.

8. The apparatus of claim 7, wherein the apparatus is further caused to:

configure a dataset comprising a plurality of entries, the dataset configured to be provided as an input to the one or more intention classifiers for predicting the intention of the customer, wherein the plurality of entries comprise an entry corresponding to each customer action from among the at least one customer action.

9. The apparatus of claim 8, wherein the entry corresponding to the each customer action is configured by summing the sequence of values corresponding to the each customer action with a sequence of values corresponding to a previous customer action.

10. The apparatus of claim 8, wherein the entry corresponding to the each customer action comprises the sequence of values corresponding to the each customer action and a sequence of values corresponding to one or more previous customer actions.

11. The apparatus of claim 7, wherein the apparatus is further caused to:

predict a sub-intention corresponding to the each customer action, wherein the fixed length of the sequence of values for the each customer action facilitates use of the one or more intention classifiers to predict the sub-intention corresponding to the each customer action; and perform at least one of averaging, weighted-averaging and majority entry based sorting of the predicted sub-intention corresponding to the each customer action to predict the intention of the customer.

12. A non-transitory computer-readable medium storing a set of instructions that when executed cause a computer to perform a method comprising:

defining a plurality of categories for classifying customer interaction data comprising information related to static customer attributes and information related to dynamic customer attributes, the plurality of categories comprising:

at least one action category for classifying information related to customer actions on one or more interaction channels, the information related to the customer actions configuring at least in part the customer interaction data, wherein the at least one action category is defined based on the dynamic customer attributes associated with the customer interaction on the one or more interaction channels, and wherein the dynamic customer attributes associated with the customer interaction correspond to attributes of the customer interaction whose values are likely to change during the customer interaction; and at least one non-action category configured to facilitate classifying of the information related to the static customer attributes associated with the customer interaction on the one or more interaction channels, wherein the information related to the static customer attributes comprises: interaction timing information or interaction frequency information, and at least one of device information, browser information, and operating system information;

receiving data signals corresponding to a customer interaction on the one or more interaction channels, the data signals comprising information related to at least one customer action on the one or more interaction channels, said information comprising binary values where a '0' value indicates a no-customer action corresponding to a particular action category and where a '1' value indicates a customer action corresponding to the particular action category;

configuring the at least one action category and the at least one non-action category to classify together as intention classifiers for the customer interaction data;

generating a sequence of values for each customer action from among the at least one customer action for classifying information related to the each customer action comprising a binary vector corresponding to each customer action associated with a fixed length, wherein a value is generated corresponding to each action category from among the at least one action category to configure the sequence of values, the sequence of values associated with the fixed length equal to a number corresponding to the at least one action category;

predicting with one or more conventional, static intention classifiers that process only fixed length inputs comprising a fixed number of predictors, an intention of a customer by using the sequence of values generated for the each customer action from among the at least one customer action, wherein the fixed length of the sequence of values facilitates use of the intention classifiers with said one or more conventional, static intention classifiers to predict the intention of the customer; and based on the predicted customer intent, automatically customizing on the one or more interaction channels a speed of interaction with the customer and customizing a speed of servicing information.

13. The computer-readable medium of claim 12, further comprising:

configuring a dataset comprising a plurality of entries, the dataset configured to be provided as an input to the one or more intention classifiers for predicting the intention of the customer, wherein the plurality of entries comprise an entry corresponding to each customer action from among the at least one customer action.

14. The computer-readable medium of claim 13, wherein the entry corresponding to the each customer action is configured by summing the sequence of values corresponding to the each customer action with a sequence of values corresponding to a previous customer action.

15. The computer-readable medium of claim 13, wherein the entry corresponding to the each customer action comprises the sequence of values corresponding to the each customer action and a sequence of values corresponding to one or more previous customer actions.

16. The computer-readable medium of claim 12, further comprising:

predicting a sub-intention corresponding to the each customer action, wherein the fixed length of the sequence of values for the each customer action facilitates use of the one or more intention classifiers to predict the sub-intention corresponding to the each customer action; and performing at least one of averaging, weighted-averaging and majority entry based sorting of the predicted sub-intention corresponding to the each customer action to predict the intention of the customer.

* * * * *